United States Patent
Panigrahy et al.

(10) Patent No.: US 7,061,927 B2
(45) Date of Patent: Jun. 13, 2006

(54) WEIGHTED RANDOM SCHEDULING PARTICULARLY APPLICABLE TO PACKET SWITCHING SYSTEMS

(75) Inventors: Rina Panigrahy, Sunnyvale, CA (US); Awais Bin Nemat, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/822,908

(22) Filed: Apr. 12, 2004

(65) Prior Publication Data

US 2005/0226263 A1    Oct. 13, 2005

(51) Int. Cl.
*H04L 12/28*    (2006.01)
(52) U.S. Cl. ...................... 370/419; 370/230
(58) Field of Classification Search ............... 370/230, 370/231, 232, 235, 236, 412–419, 389–392
See application file for complete search history.

(56) References Cited

U.S. PATENT DOCUMENTS

| | | | |
|---|---|---|---|
| 4,733,390 A | | 3/1988 | Shirakawa et al. |
| 5,500,858 A | | 3/1996 | McKeown |
| 5,923,644 A | | 7/1999 | McKeown et al. |
| 6,212,182 B1 | | 4/2001 | McKeown |
| 6,262,986 B1 | * | 7/2001 | Oba et al. .................... 370/399 |
| 6,757,246 B1 | * | 6/2004 | Alasti et al. ................. 370/230 |
| 2001/0043606 A1 | | 11/2001 | Han et al. |
| 2003/0072326 A1 | * | 4/2003 | Alasti et al. ................. 370/462 |
| 2003/0193941 A1 | | 10/2003 | Bonomie et al. |
| 2004/0165598 A1 | * | 8/2004 | Shrimali et al. ......... 370/395.42 |
| 2004/0218600 A1 | * | 11/2004 | Alasti et al. ................. 370/389 |

FOREIGN PATENT DOCUMENTS

| EP | 1052814 A | 11/2000 |
|---|---|---|
| WO | WO 03/085909 | 10/2003 |

OTHER PUBLICATIONS

U.S. Appl. No. 10/109,785, filed Mar. 30, 2002, Bonomi et al.

(Continued)

*Primary Examiner*—Bob A. Phunkulh
(74) *Attorney, Agent, or Firm*—The Law Office of Kirk D. Williams

(57) ABSTRACT

Weighted random scheduling is preformed, which may be particularly applicable to packet switching systems. For each particular input of multiple switch inputs, a request to send a packet to one of the outputs of the switch is generated by weighted randomly selecting one of the outputs to which the particular input has one or more packets to send. One of the requests is granted for each different one of the outputs for which one or more requests were generated. Packets are sent between the inputs and the output corresponding to the granted requests. The weighted random selection is typically weighted based on the number of packets or bytes to send to each of the outputs by a corresponding input of the inputs, the last times packets were sent from a corresponding input of the inputs to each of the outputs, and/ classes of service associated with packets to send to each of the outputs by a corresponding input of the inputs.

34 Claims, 9 Drawing Sheets

OTHER PUBLICATIONS

U.S. Appl. No. 10/339,032, filed Jan. 9, 2003, Cohen et al.
U.S. Appl. No. 10/684,282, filed Oct. 10, 2003, Patrick A. Costello.
Anderson et al., *High-Speed Switch Scheduling for Local Area Networks*, ACM Transactions on Computer Systems, vol. 11, No. 4, Nov. 1993, pp. 319-352.
Mckeown et al., *Achieving 100% Throughput in an Input-Queued Switch*, in IEEE Infocom, 1996.
Nick Mckeown, *The iSlip Scheduling Algorithm for Input-Queued Switches*, IEEE/ACM Transactions on Networking, vol. 7, No. 2, Apr. 1999, pp. 188-201.
Mckeown et al., *Tiny Tera: A Packet Switch Core*, IEEE MICRO, vol. 17, Issue 1, Jan.-Feb. 1997, pp. 26-33.
Nick Mckeown and Thomas E. Anderson, *A Quantitative Comparison of Scheduling Algorithms for Input-Queued Switches*, Computer Networks and ISDN Systems, vol. 30, No. 24, pp. 2309-2326, Dec. 1998.
Pankaj Gupta and Nick Mckeown, *Designing and Implementing a Fast Crossbar Scheduler*, IEEE MICRO, vol. 19, Issue 1, Jan.-Feb. 1999, pp. 20-28.
Wenzhe Cui et al., *A threshold based scheduling algorithm for input queue switch*, IEEE, 2001, pp. 207-212.
Chao H J et al., *Centralized contention resolution schemes for a large-capacity optical ATM switch*, ATM Workshop Proceedings, 1998 IEEE, Fairfax, VA, USA pp. 11-16, May 26, 1998.

\* cited by examiner

WEIGHTED RANDOM SCHEDULING PARTICULARLY APPLICABLE TO PACKET SWITCHING SYSTEMS

TECHNICAL FIELD

This invention especially relates to communications and computer systems; and more particularly, the invention relates to weighted random scheduling particularly applicable to packet switching systems.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet. There are many different scheduling algorithms that achieve one hundred percent throughput within a centrally scheduled, inputs queued switch. Input queued switches typically store packets destined for different destinations in a single queue which can lead to blocking conditions. To avoid this head of queue blocking, many network devices have at each input multiple virtual output queues (VoQs), with one or more queues corresponding to each output of the respective network device. This architecture requires the scheduling of the sending of packets from these multiple VoQs (in contrast to selecting the packet at the head of the single input queue). Prior systems use a combination of virtual output queues (VoQs) and scheduling algorithms based on maximal weight matching. However, the practical implementations of these scheduling algorithms are complex and expensive to implement in hardware at high speed, and is becoming more problematic as line rates continue to increase.

For example, SLIP is an algorithm for scheduling the sending of packets across an N×N switch. In one implementation, the following three steps are performed:
1. Each unmatched input sends a request to every output for which it has a queued cell.
2. If an unmatched output receives any requests, it chooses the one that appears next in a fixed, round-robin schedule starting from the highest selection priority element. The output notifies each input whether or not its request was granted. The pointer to the highest selection priority element of the round-robin schedule is incremented (modulo N) to one location beyond the granted input if and only if the grant is accepted in step 3 of the first iteration. The pointer is not incremented in subsequent iterations.
3. If an input receives a grant, it accepts the one that appears next in a fixed, round-robin schedule starting from the highest selection priority element. The pointer to the highest selection priority element of the round-robin schedule is incremented (modulo N) to one location beyond the accepted output.

I-SLIP is a scheduling algorithm including multiple iterations of the SLIP algorithm to determine the scheduling of packets for each round of sending packets (rather than just one SLIP iteration.)

Each output scheduler decides among the set of ordered, competing requests using a rotating selection priority. When a requesting input is granted and the input accepts that grant, the input will have the lowest selection priority at that output in the next cell time. Also, whatever input has the highest selection priority at an output will continue to be granted during each successive time slot until it is serviced. This ensures that a connection will not be starved: the highest selection priority connection at an output will always be accepted by an input in no more than N cell times.

Moving the pointers not only prevents starvation, it tends to desynchronize the schedulers. Each of the outputs that matched in the previous time slot will have a different highest selection priority input. Thus, they will each grant to different inputs. Consider an example in which two inputs are both requesting the same two outputs. Initially, both outputs may grant to the same input; in that case only one connection will be made in the first iteration.

The successful output will increment its pointer and in the next cell time, the outputs will no longer contend: one will have moved on to grant to another input and the other will grant to the same input as before. This leads to a better match in the first iteration of the next cell time. This is because the output schedulers have become desynchronized (or "slipped") with respect to each other. This leads to high performance, even for a single iteration of SLIP.

Because of the round-robin movement of the pointers, the algorithm tends to provide a fair allocation of bandwidth among competing connections and to be burst-reducing. The burst-reduction is simplest to understand under high load when all input queues are occupied: the algorithm will visit each competing connection in turn, so that even if a burst of cells for the same output arrives at the input, the burst will be spread out in time if there is competing traffic.

An example implementation is described in Nicholas W. McKeown, "Method and Apparatus for Scheduling Cells in an Input-Queued Switch, U.S. Pat. No. 5,500,858, issued Mar. 19, 1996, which is hereby incorporated by reference. Another example implementation is described in Nicholas W. McKeown, "Combined Unicast and Multicast Scheduling," U.S. Pat. No. 6,212,182, issued Apr. 3, 2001, which is hereby incorporated by reference.

SUMMARY

Disclosed are, inter alia, methods, apparatus, data structures, computer-readable media, mechanisms, and means for weighted random scheduling particularly applicable to packet switching systems. One embodiment generates a request to send a packet to one of the outputs of the switch for each input of a switch by weighted randomly selecting one of the outputs to which the particular input has one or more packets to send. One of the requests is granted for each different one of the outputs for which one or more requests were generated. Packets are sent between the inputs and the output corresponding to the granted requests.

In one embodiment, a round consisting of generating the request, granting one of the requests, and sending packets is performed at least two times per packet time, with a packet time corresponding to the amount of time allocated to receive a packet at an input from an external source. In one embodiment, the switch is configured to setup connections between the switch inputs and the outputs corresponding to the granted requests prior to the sending packets. In one embodiment, the granting one of the requests includes randomly selecting one of the requests for each of the outputs for which one or more of the requests were generated. One embodiment performs one or more rounds of generating requests by weighted randomly selecting among all or a subset of the outputs, and selectively granting the requests corresponding to available bandwidth after granting one of the requests and before sending packets.

In one embodiment, the weighted random selection is weighted based on a number of packets to send to each of the outputs by a corresponding input of the inputs. In one embodiment, the weighted random selection is weighted based on a number of bytes to send to each of the outputs by a corresponding input of the inputs. In one embodiment, the weighted random selection is weighted based on the last times packets were sent from a corresponding input of the inputs to each of the outputs. In one embodiment, the weighted random selection is weighted based on classes of service associated with packets to send to each of the outputs by a corresponding input of the inputs. In one embodiment, the weighted random selection is weighted based on at least two items from a group consisting of: (a) the number of packets to send to each of the outputs by a corresponding input of the inputs, (b) the number of bytes to send to each of the outputs by a corresponding input of the inputs, (c) the last times packets were sent from a corresponding input of the inputs to each of the outputs, and (d) classes of service associated with packets to send to each of the outputs by a corresponding input of the inputs.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
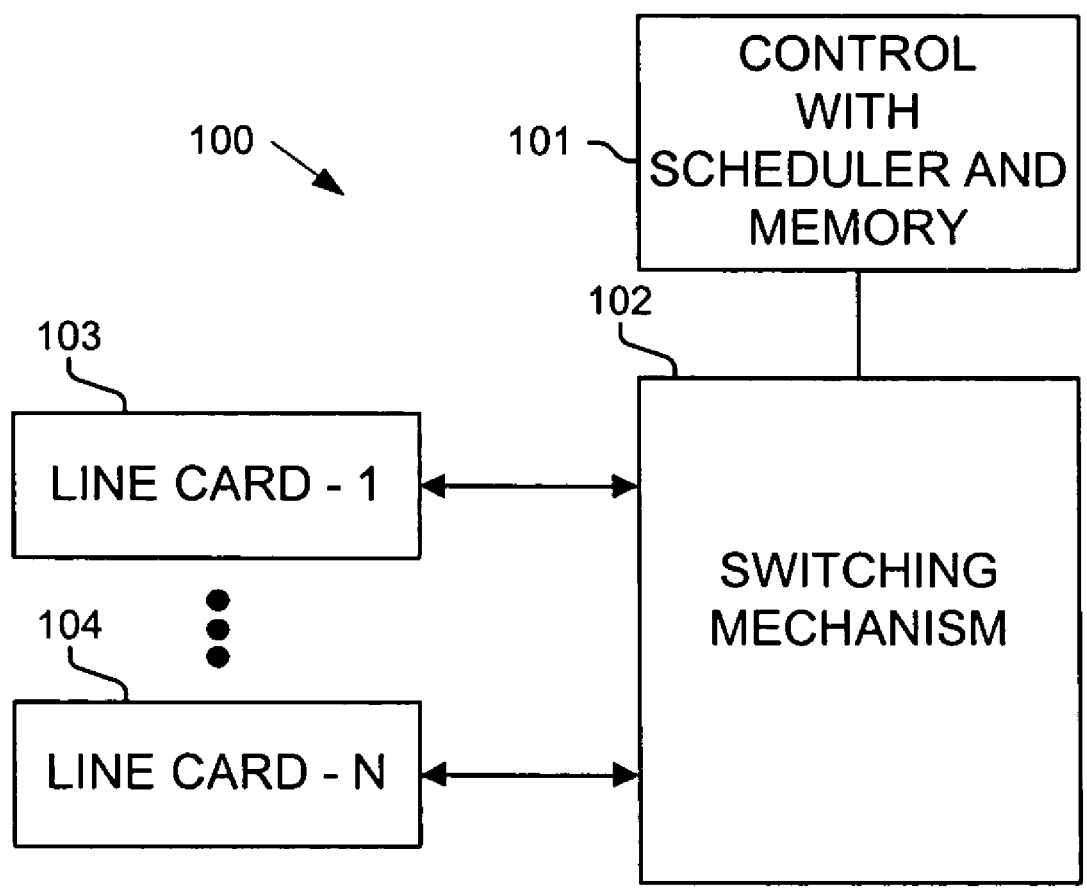
FIGS. 1A–C and 2A–B are block diagrams of a few of an unlimited number of embodiments using weighted random scheduling of packets.

Disclosed are, inter alia, methods, apparatus, data structures, computer-readable media, mechanisms, and means for weighted random scheduling particularly applicable to packet switching systems.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism.The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable media, mechanisms, and means for weighted random scheduling particularly applicable to packet switching systems. One embodiment generates a request to send a packet to one of the outputs of the switch for each input of a switch by weighted randomly selecting one of the outputs to which the particular input has one or more packets to send. One of the requests is granted for each different one of the outputs for which one or more requests were generated. Packets are sent between the inputs and the output corresponding to the granted requests.

In one embodiment, a round consisting of generating the request, granting one of the requests, and sending packets is performed at least two times per packet time, with a packet time corresponding to the amount of time allocated to receive a packet at an input from an external source. In one embodiment, the switch is configured to setup connections between the switch inputs and the outputs corresponding to the granted requests prior to the sending packets. In one embodiment, the granting one of the requests includes randomly selecting one of the requests for each of the outputs for which one or more of the requests were generated. One embodiment performs one or more rounds of generating requests by weighted randomly selecting among all or a subset of the outputs, and selectively granting the requests corresponding to available bandwidth after granting one of the requests and before sending packets.

In one embodiment, the weighted random selection is weighted based on a number of packets to send to each of the outputs by a corresponding input of the inputs. In one embodiment, the weighted random selection is weighted based on a number of bytes to send to each of the outputs by a corresponding input of the inputs. In one embodiment, the weighted random selection is weighted based on the last times packets were sent from a corresponding input of the inputs to each of the outputs. In one embodiment, the weighted random selection is weighted based on classes of service associated with packets to send to each of the outputs by a corresponding input of the inputs. In one embodiment, the weighted random selection is weighted based on at least two items from a group consisting of: (a) the number of packets to send to each of the outputs by a corresponding input of the inputs, (b) the number of bytes to send to each of the outputs by a corresponding input of the inputs, (c) the last times packets were sent from a corresponding input of the inputs to each of the outputs, and (d) classes of service associated with packets to send to each of the outputs by a corresponding input of the inputs.

One embodiment includes multiple request generators and one or more grant arbiters coupled to the request generators. Each of the request generators is configured to weighted randomly generate a request for its associated input of multiple inputs of a switch, the request including a weighted random selection of one of the outputs of the switch. One or more grant arbiters are configured to grant requests received from the request generators such that one request for each requested output is granted. The inputs are configured to send packets corresponding to said granted requests.

One embodiment includes a control to configure the switch to setup connections between said inputs and said outputs corresponding to said granted requests. In one embodiment, one or more grant arbiters randomly select a request to grant for a particular output from said requests received for the particular output. In one embodiment, inputs are configured to send packets from their respective virtual output queues corresponding to the granted requests. One embodiment includes multiple line cards and a switching board including the switch. In one embodiment, the virtual output queues are located on the line cards. In one embodiment, the virtual output queues are located on the switching board.

In one embodiment, the weighted random selection is weighted based on a number of packets or bytes to send to each of the outputs by a corresponding input of the inputs. In one embodiment, the weighted random selection is weighted based on the last times packets were sent from a corresponding input of the inputs to each of the outputs. In one embodiment, the weighted random selection is weighted based on classes of service associated with packets to send to each of the outputs by a corresponding input of the inputs. In one embodiment, the weighted random selection is weighted on at least two items from a group consisting of: (a) the number of packets to send to each of the outputs by a corresponding input, (b) the number of bytes to send to each of the outputs by a corresponding input, (c) the last times packets were sent from a corresponding input to each of the outputs, and (d) the classes of service associated with packets to send to each of the outputs by a corresponding input.

One embodiment, for each particular input of a inputs, generates a first request including weighted randomly selecting one of the outputs. One of the first requests for each different one of the outputs for which one or more of said first requests was generated is granted. For each particular input of the inputs whose first request was not granted, a second request is generated, which includes weighted randomly selecting one of the outputs (possibly limited to those not already have a request previously granted). One of said second requests is granted for each different one of the outputs not already having a corresponding first request granted and for which one or more of said second requests was generated.

In one embodiment, the weighted random selection is weighted based on the number of packets or bytes to send to each of the outputs by the corresponding input. In one embodiment, packets are sent between said inputs and said outputs based said granted first and second requests. In one embodiment, only two request phases are performed per packet time, said two request phases consisting of said generating said first requests and said generating said second requests. In one embodiment, each particular request to grant of said first requests and said second requests for each particular output is randomly selected from all the respective said first requests or said second request for said particular output.

One embodiment includes multiple request generators and one or more grant arbiters coupled to the request generators. Each of the request generators is configured to weighted randomly generate a first round request and as required a second round request for its associated input of a inputs of a switch, with the first round request including a first weighted random selection of one of a outputs and the second round request including a second weighted random selection of one of the outputs if the first round request was not granted. The grant arbiters are configured to grant requests received from the request generators such that one request for each requested output in the first round of requests is granted, and one request for each requested output in the second round of requests is granted if a grant for said requested output was not generated for a request in the first round of requests.

In one embodiment, the one or more grant arbiters randomly select a request to grant for a output from the set of requests received for the output. In one embodiment, the weighted random generation is weighted based on the number of packets or bytes to send to each of the outputs by the corresponding input.

One embodiment randomly picks one of the candidate virtual output queues/destination for each switch input, where the random selection is weighted by the length of each of the queues for the input. Scheduling requests are then sent to the chosen destination. Each destination, after getting requests from all the candidate inputs, sends a grant back to the randomly chosen input. Inputs that get a grant back from the destination, will send a corresponding packet in the corresponding packet time. The two stage random selection process represents a single phase of the weighted random selection process. A second phase is performed for those switch inputs that have not received a grant and for those destinations for which a grant was not generated in the first phase (i.e., no request was generated during the first phase). In this manner, a minimal amount of scheduling overhead is incurred, and desired traffic throughput is received when these two scheduling phases are performed in the time allotted to send one or more packets through the switch. One embodiment performs more than two scheduling phases in the time allotted to send one or more packets through the switch.

FIGS. 1A–C and 2A–B are block diagrams of a few of an unlimited number of embodiments using weighted random scheduling of packets. Turning first to FIG. 1A, illustrated is a system 100 including a switching mechanism (e.g., a physical switching unit, a switching fabric, a crossbar, bus, or any other mechanism for switching packets, etc.) 102, a control with scheduler and memory 101, and multiple line cards 103–104. System 100 schedules packets being sent among line cards 103–104 using weighted random scheduling. Note, weighted random scheduling can be used in conjunction with a blocking or a non-blocking switch.

Figure 1B:
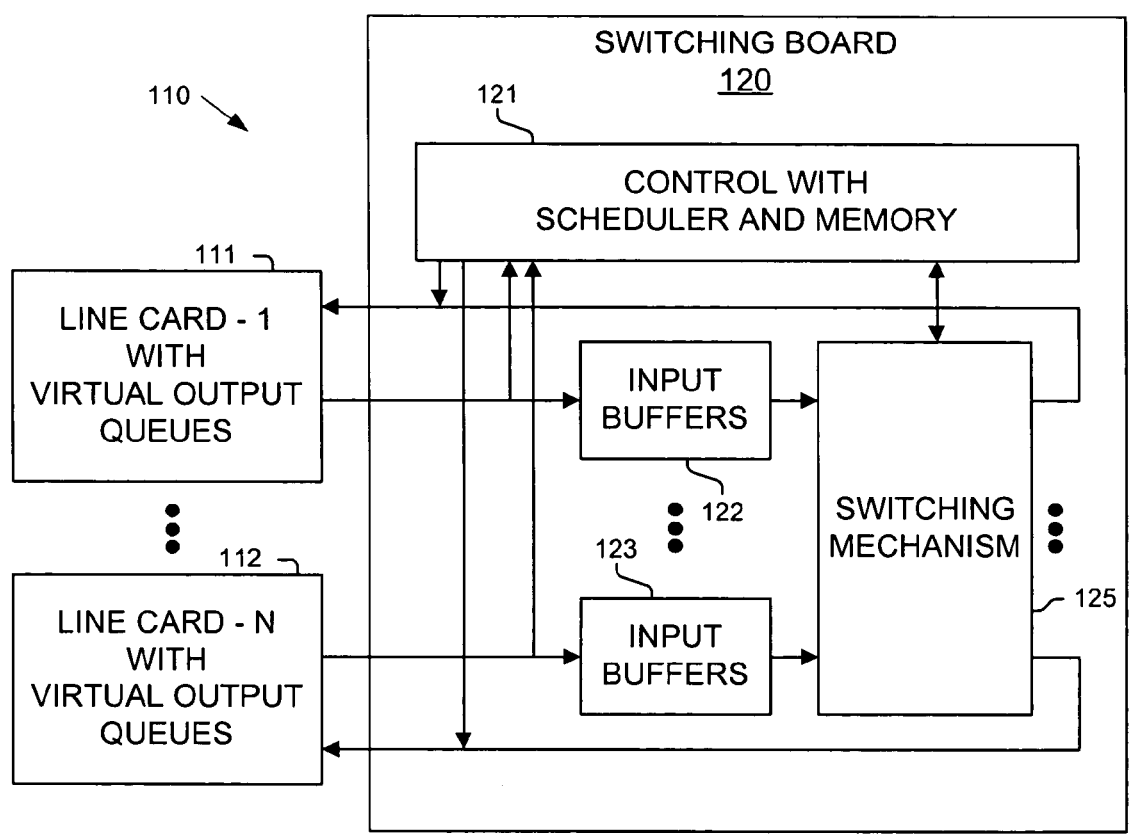

FIG. 1B illustrates a system 110 that uses weighted random scheduling of packets. Line cards 111–112 each contain virtual output queues in this exemplary embodiment, and switching board 120 includes a control with scheduler and memory 121, multiple buffers 122–123, and a switching mechanism 125. Line cards 111–112 generate the scheduling requests based on a weighted random selection. Packets are then sent to input buffers 122–123 according to the determined weighted random scheduling, with the particular weight applied being typically based on the occupancies of the virtual output queues and/or characteristics of the packets (e.g., number of packets or bytes, age of packets, quality of service, etc.). Note, in one embodiment, input buffers 122–123 can each store multiple packets, and thus previously weighted random scheduled packets can be queued while the scheduling is performed for subsequent packet times. Control with scheduler and memory 121 typically generates the grants based on the received scheduling requests, and controls the configuration of switching mechanism 125 so as to allow the scheduled packets to be sent through it.

Figure 1C:
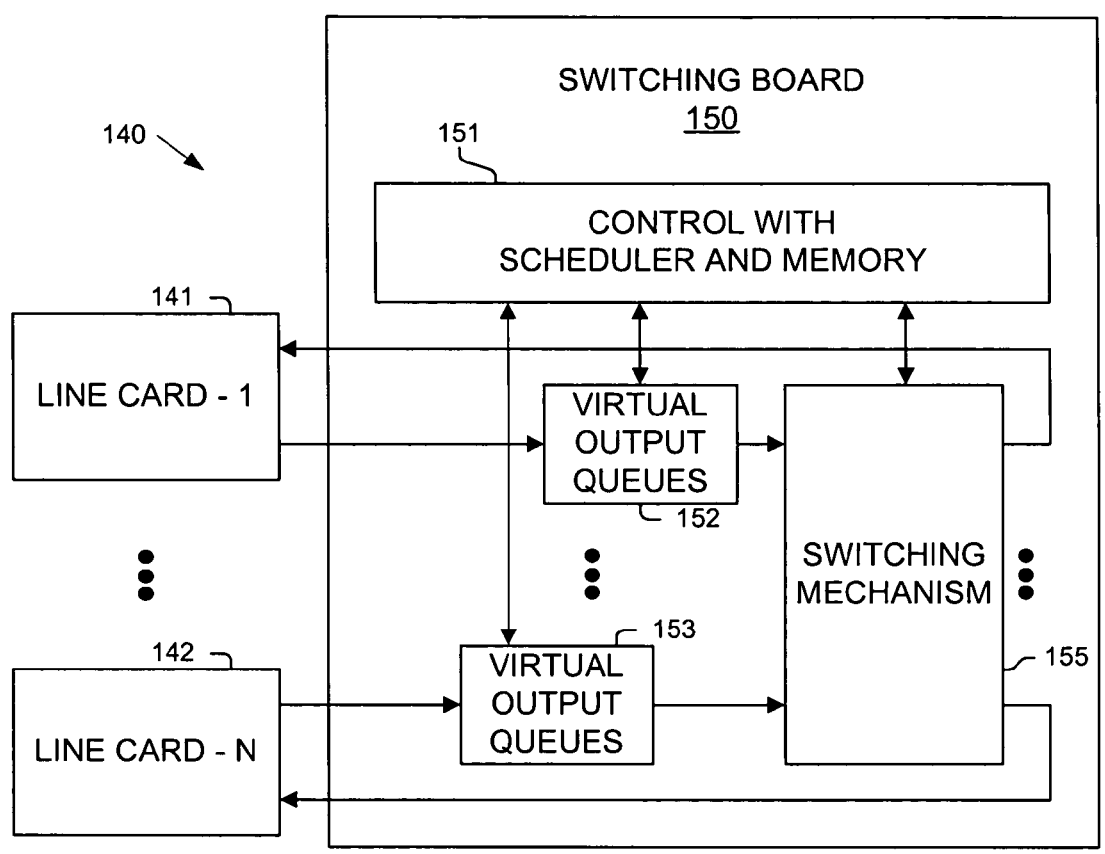

FIG. 1C illustrates a system 140 that uses weighted random scheduling of packets. Line cards 141–142 communicate packets with switching board 150 in this exemplary embodiment, and switching board 150 includes a control with scheduler and memory 151, virtual output queues 152–153, and a switching mechanism 155. In this embodiment, the weighted random scheduling of packets is performed by control with scheduler and memory 151, with the particular weight applied being typically based on the occupancies of the virtual output queues 152–153 and/or characteristics of the packets (e.g., number of packets or bytes, age of packets, quality of service, etc.). Packets are then sent from virtual output queues 152–153 according to the determined weighted random scheduling, with the configuration of switching mechanism 155.

Figure 2A:
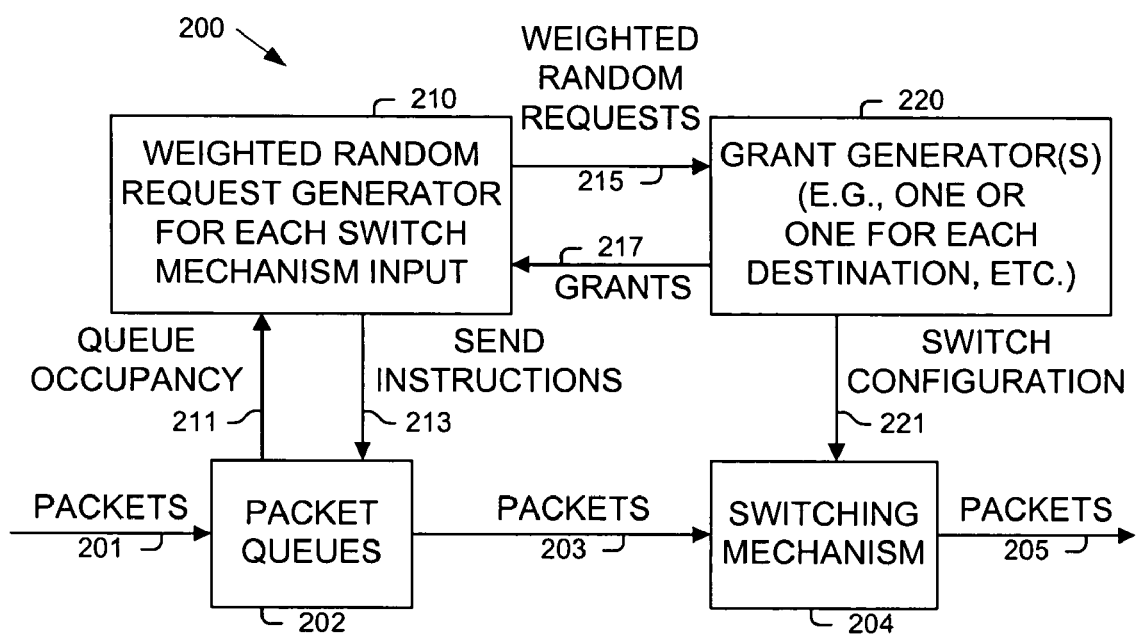

FIG. 2A illustrates a system 200 that uses weighted random scheduling of packets. Packets 201 are received and placed in packet queues 202. The queue occupancies 211 are communicated to the weighted random request generator 210 for each switch input (also referred to herein as a switch input), which also communicated with grant generator(s) 220 (e.g., one grant generator, one grant generator for each destination, etc.). Grant generator(s) 220 communicate the determined switch configuration 221 to the switching mechanism 225 based on the generated grants 217, and the weighted random request generators 210 provide send instructions to packet queues 202 to send packets corresponding to the weighted random scheduled packets. Packets 203 are sent from packet queues 202, through the accordingly configured switching mechanism 204 to produce the switched packets 205.

Figure 2B:
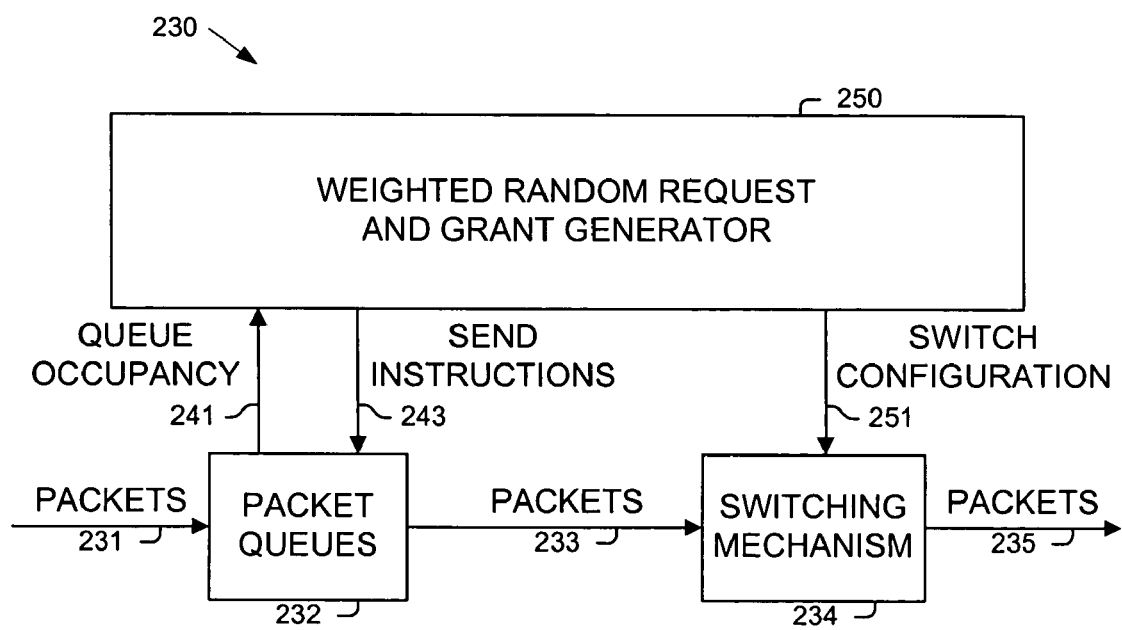

FIG. 2B illustrates a system 230 that uses weighted random scheduling of packets. Packets 231 are received and placed in packet queues 232. The queue occupancies 241 are communicated to the weighted random generator 210 for each switching mechanism input. Weighted random request and grant generator 250 uses one or more processes and/or customized control logic to perform the weighted random scheduling of packets, and to inform packet queues 232 of the packets to send (243) and switching mechanism 234 of the corresponding switch configuration 251. Packets 213 are sent from packet queues 232, through the accordingly configured switching mechanism 234 to produce the switched packets 235.

Figure 3:
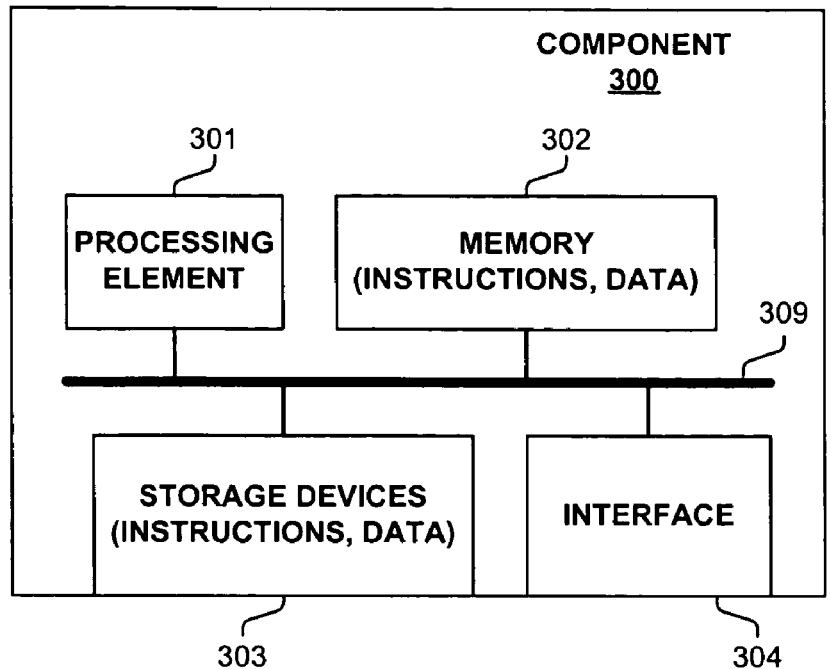
FIG. 3 is a block diagram of a component used in one embodiment for performing weighted random scheduling.

FIG. 3 is a block diagram of a component 300 used in one embodiment for performing weighted random scheduling, such as for generating weighted random requests and/or grants. In one embodiment, component 300 performs one or more processes corresponding to one of the flow diagrams illustrated or otherwise described herein.

In one embodiment, system or component 300 includes a processing element 301, memory 302, storage devices 303, and an interface 304 for sending and receiving packets, items, and/or other information (e.g., queue occupancy, instructions to send packets, switch configuration to a communicatively coupled switch, etc.), which are typically coupled via one or more communications mechanisms 309 (shown as a bus for illustrative purposes.) In one embodiment, memory 302 and/or storage devices 303 are used to store packets on which the weighted random scheduling of the packets is performed.

Various embodiments of component 300 may include more or less elements. The operation of component 300 is typically controlled by processing element 301 using memory 302 and storage devices 303 to perform one or more tasks or processes. Memory 302 is one type of computer-readable media, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable media, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

Figure 4A:
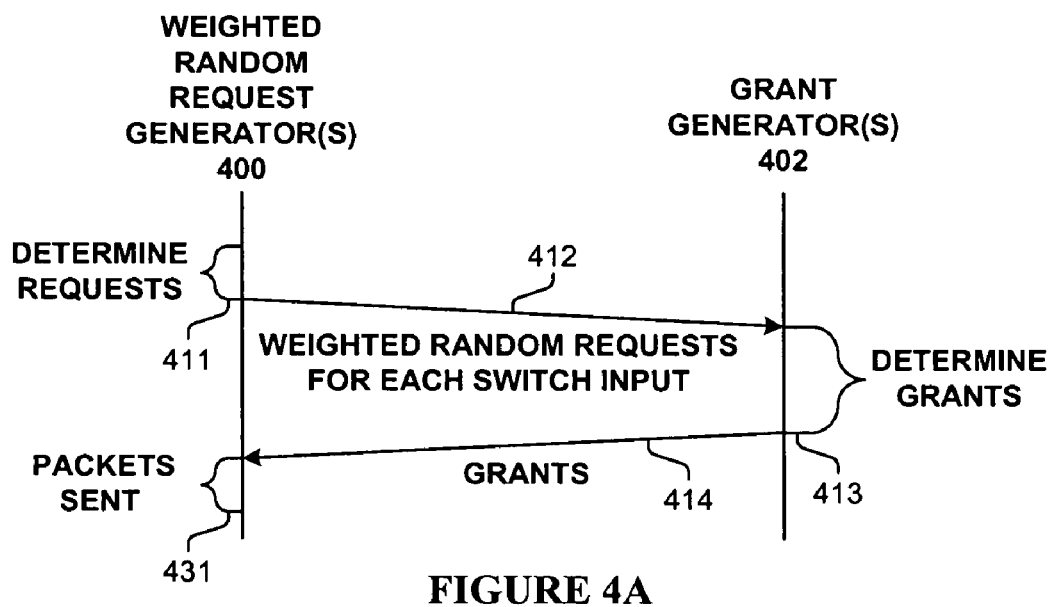
FIG. 4A is a diagram illustrating the generation of requests and grants as performed in one embodiment.

FIG. 4A is a diagram illustrating the generation of requests and grants used in one embodiment. Weighted random request generators 400 determine a request for each switch input as indicated by processing 411. This selection is weighted based on the occupancies of the virtual output queues and/or characteristics of the packets (e.g., number of packets or bytes, age of packets, quality of service i.e., higher priority traffic is given greater weight, etc.).

For example, assume there are four switch outputs, with eight packets queued at one input with one packet queued for the first output, two packets queued for the second output, one packet queued for the third output, and four packets queued for the fourth output. One embodiment uses a direct weighted proportion of the number of queued packets, while one embodiment uses different proportion calculation based on the occupancy of the virtual output queues. In this example, one embodiment uses a weight of one-eighth to send a packet from the queue corresponding to switch output/destination one; a weight of one-quarter to send a packet from the queue corresponding to switch output/destination two; a weight of one-half to send a packet from the queue corresponding to switch output/destination three; and a weight of one-eighth to send a packet from the queue corresponding to switch output/destination four. Then, a random number (i.e., a true random number, a pseudo random number, or any approximated random value) is generated with a corresponding destination four selected four times as likely as destinations one or three, and twice as likely as destination two. There are many techniques for determining this weighted selection. For example, one embodiment maps the percentages for each of the destination to a cumulative fractional value between zero and one, and a random value between zero and one is generated. In this example, destination one corresponds to 0.00 to 0.125, destination two corresponds to 0.126 to 0.375, destination three corresponds to 0.376 to 0.500, and destination four corresponds to 0.501 to 1.000.

Returning to FIG. 4A, the determined weighted random requests 412 for each switch input are communicated to grant generator(s) 402, which randomly or otherwise select one of the requests for each destination for which a request was made (as illustrated by processing 413). These grants 414 are communicated to weighted random request generator(s) 400 (or in one embodiment to the control for sending packets and/or the control for configuring the switch). Packets are sent according to the grants as illustrated by reference number 431. In one embodiment, typically one packet per grant is sent as that is the most that can be sent from one input to one output of a switch at one time. However, in one embodiment, multiple packets can be sent from an input and/or received by an output at a time, so the number of requests generated for an input and the number of grants generated for an output is accordingly adjusted.

Figure 4B:
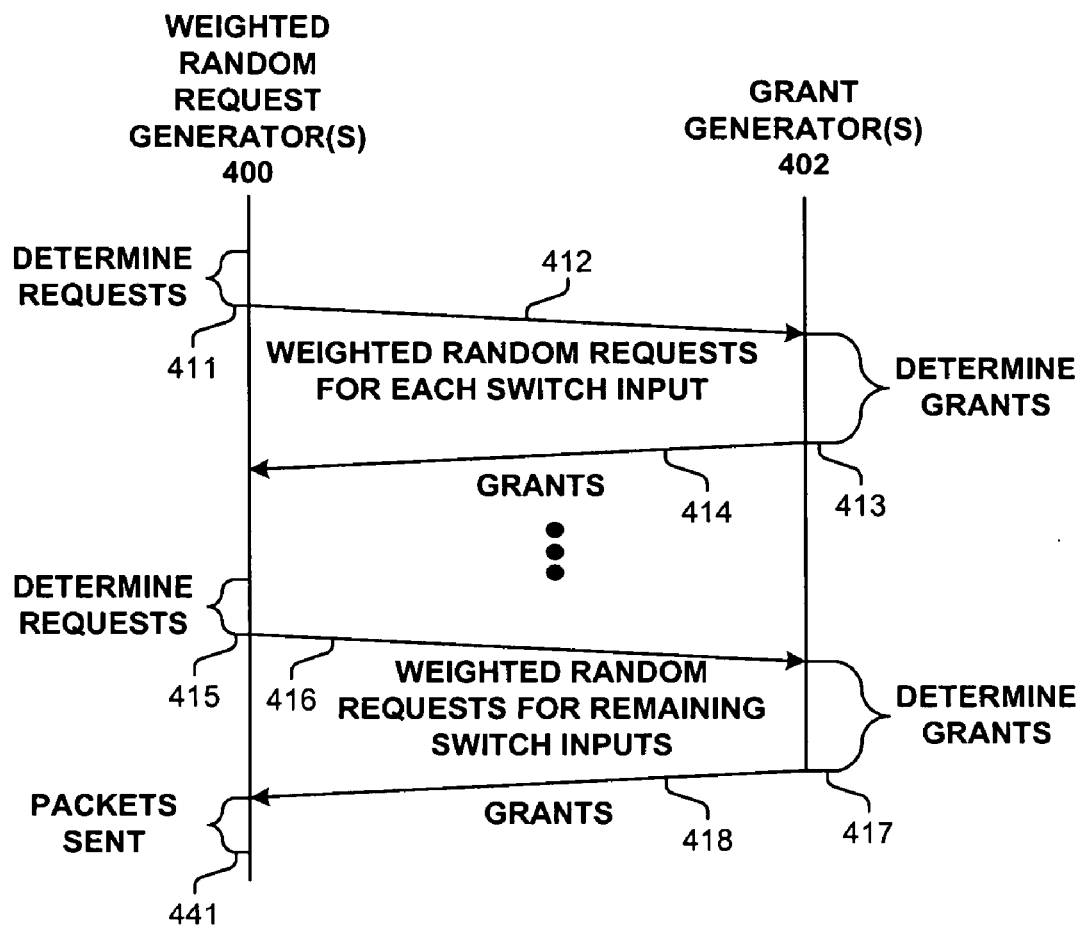
FIG. 4B is a diagram illustrating the generation of requests and grants as performed in one embodiment.

FIG. 4B is similar to FIG. 4A with the addition used in one embodiment to perform multiple requests/grant rounds prior to sending packets corresponding to the generated grants. Weighted random request generators 400 determine a request for each switch input as indicated by processing 411. This selection is weighted based on the occupancies of the virtual output queues and/or characteristics of the packets (e.g., number of packets or bytes, age of packets, quality of service i.e., higher priority traffic is given greater weight, etc.). The determined weighted random requests 412 for each switch input are communicated to grant generator(s) 402, which randomly or otherwise select one of the requests for each destination for which a request was made (as illustrated by processing 413). These grants 414 are communicated to weighted random request generator(s) 400.

Each request generator that did not receive a grant, then performs an additional request phase, including determining their requests based on a weighted random selection based on the occupancies of the virtual output queues and/or characteristics of the packets in their queues (415). In one embodiment, the additional requests may have been determined prior to receiving a grant 414. In one embodiment, all destinations remain available for a request in the additional phase. In one embodiment, grants 414 include an indication of the granted destinations, and thus these destinations can be removed from contention in identifying a destination for which to request during the second phase. In one embodiment, the additional phase request determination excludes the destination requested in a prior phase (as it was granted to a different requester and is unavailable during the additional phase) from the weighted random selection in the additional phase. In one embodiment, more than one packet can be sent from an input and/or received by an output in a packet time, and therefore the number of requests and/or grants are accordingly increased.

The weighted random requests 416 for the switch inputs that can send more packets in a packet time (e.g., their prior phase request was not granted) are communicated to grant generator(s) 402, which then randomly or otherwise select (417) among the received requests 416 for the destinations which can accept additional packets in a packet time (e.g., those destinations which did not receive/grant a request during a prior phase in one embodiment). The additional phase grants 418 are then communicated to weighted random request generator(s) 400 (or in one embodiment to the control for sending packets and/or the control for configuring the switch). Packets are sent according to the grants as illustrated by reference number 441. The number of rounds of request/grant phases may vary based on the embodiment, and can include one, two, or even more than two rounds.

Figure 5A:
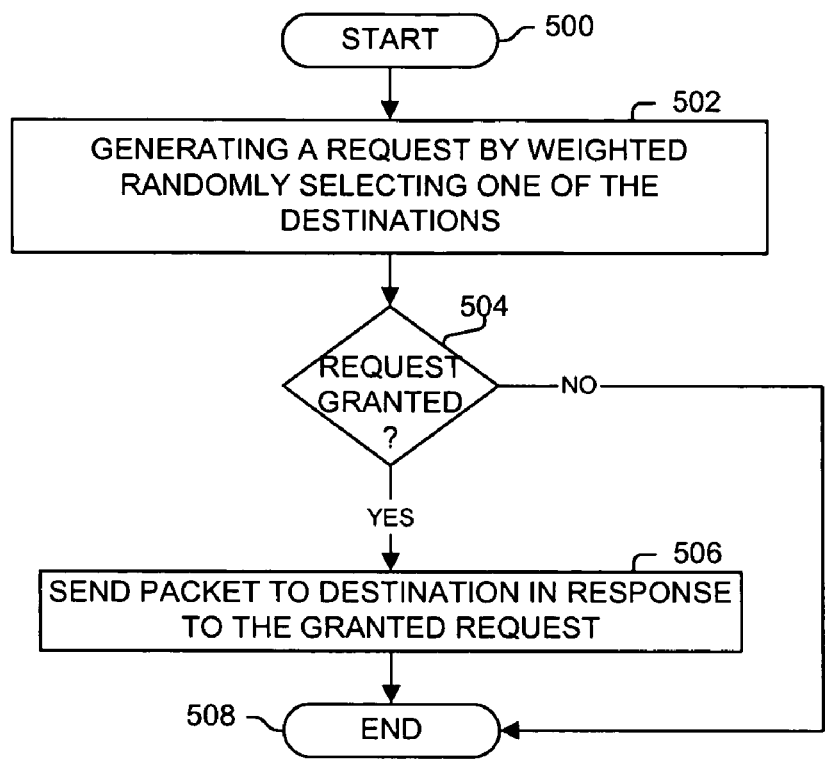
FIG. 5A is a flow diagram of a process used in one embodiment for performing weighted random scheduling of packets including determining requests based on a weighted random selection of destinations of pending packets at a switch input.

FIG. 5A is a flow diagram of a process used in one embodiment for performing weighted random scheduling of packets by a request generator for a particular switch input. Processing begins with process block 500, and proceeds to process block 502, wherein a request is generated by identifying one of the possible destinations (i.e., identifying the destination/switch output, virtual output queue, or other corresponding value) based on a weighted random selection based on packet occupancies of the virtual output queues and/or characteristics of the packets (e.g., number of packets or bytes, age of packets, quality of service i.e., higher priority traffic is given greater weight, etc.). As determined in process block 504, if the request was granted, then in process block 506, a packet is sent to the destination from the virtual output queue corresponding to the destination. Processing is complete as indicated by process block 508.

Figure 5B:
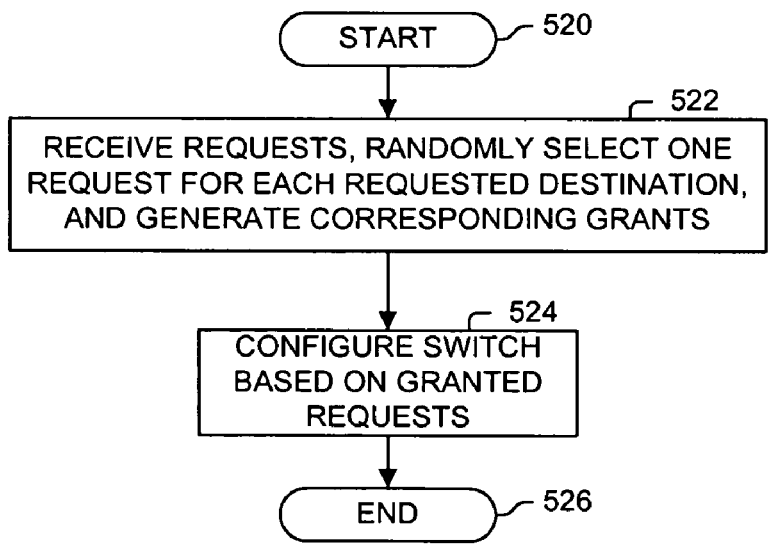
FIG. 5B is a flow diagram of a process used in one embodiment for determining grants in response to received requests.

FIG. 5B is a flow diagram of a process used in one embodiment for determining grants from received requests. Processing begins with process block 520, and proceeds to process block 522, wherein zero or more requests are received for each particular destination, and one of these requests is randomly or otherwise selected for each particular destination, and a corresponding grant is communicated to the requester. In process block 524, the switch is configured, if required, based on the granted requests so the packets can be sent (e.g., in process block 506 of FIG. 5A). Processing is complete as indicated by process block 526.

Figure 6:
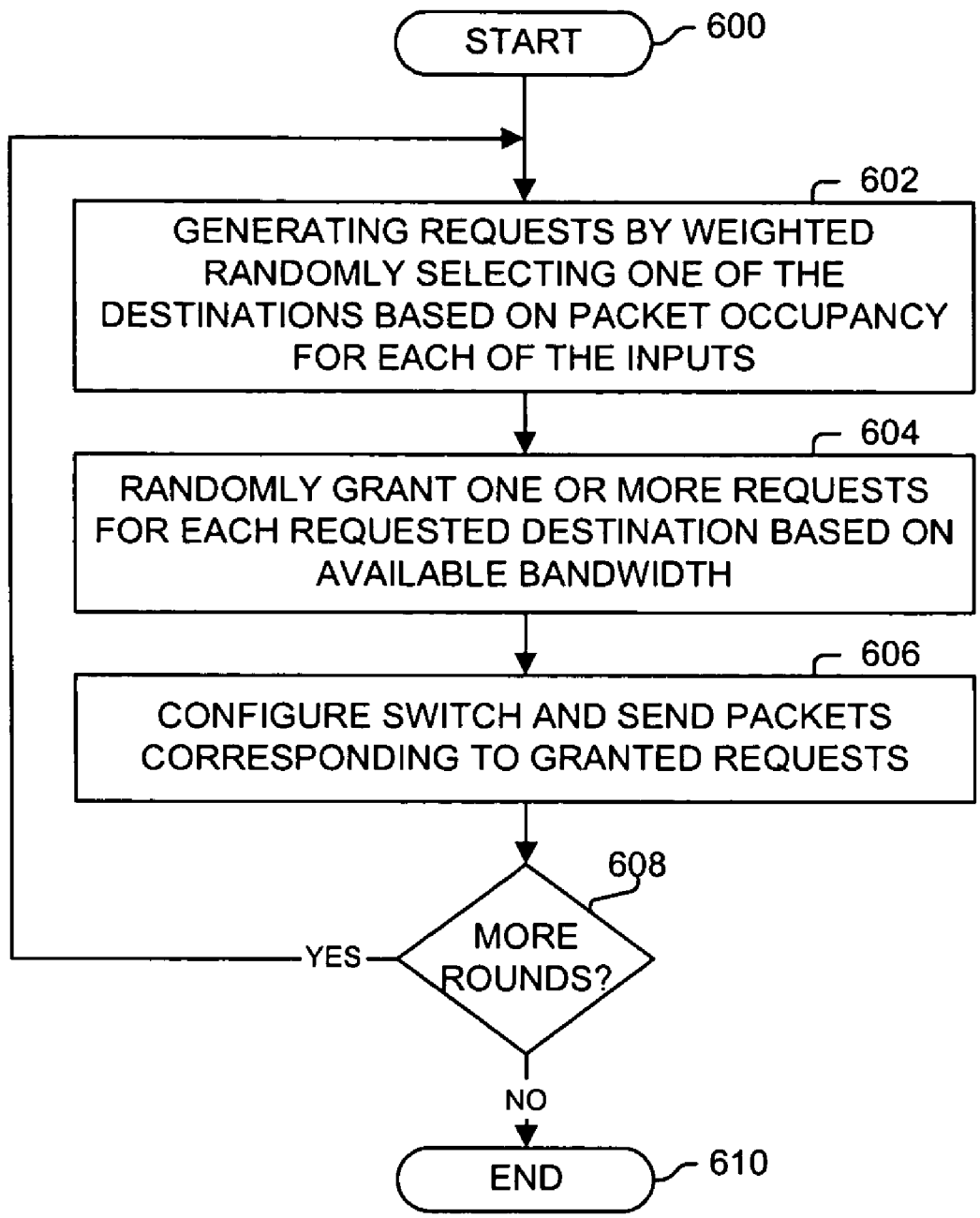
FIG. 6 is a flow diagram of a process used in one embodiment for performing weighted random scheduling of packets.

FIG. 6 is a flow diagram of a process used in one embodiment for performing weighted random scheduling of packets in a packet time, with a packet time corresponding to the amount of time allocated to receive a packet at an input of a switch from an external source. Processing begins with process block 600, and proceeds to process block 602, wherein requests are generated for each switch input having one or more packets to send based on a weighted random selection. In process block 604, one of the requests for each of the requested destinations is randomly or otherwise granted. In process block 606, the switch is configured, if required, to accommodate the granted requests, and the packets are sent from the corresponding inputs to the corresponding outputs. As determined in process block 608, if there are more request/grant/send packet rounds to be performed in the packet time, processing returns to process block 602. Otherwise, processing is complete as indicated by process block 610.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
 for each input of a plurality of inputs of a switch:
  generating a request to send a packet to one of a plurality of outputs of the switch from said input, said generating the request including weighted randomly selecting one of the plurality of outputs of the switch to which said input has a packet to send;

granting one of said requests for each different one of the plurality of outputs for which one or more of said requests were generated; and sending packets between said inputs and said outputs corresponding to said granted requests.

2. The method of claim 1, wherein a round consisting of said generating the request, said granting one of said requests, and said sending packets is performed at least two times per packet time, said packet time corresponding to the amount of time allocated to receive a packet at an input of the switch from an external source.

3. The method of claim 2, comprising configuring the switch to setup connections between said inputs and said outputs corresponding to said granted requests prior to said sending packets.

4. The method of claim 1, wherein said granting one of said requests includes randomly selecting one of said requests for each of the plurality of outputs for which one or more of said requests were generated.

5. The method of claim 1, wherein said weighted random selection is weighted based on a number of packets to send to each of the plurality of outputs by a corresponding input of the plurality of inputs.

6. The method of claim 1, wherein said weighted random selection is weighted based on a number of bytes to send to each of the plurality of outputs by a corresponding input of the plurality of inputs.

7. The method of claim 1, wherein said weighted random selection is weighted based on the last times packets were sent from a corresponding input of the plurality of inputs to each of the plurality of outputs.

8. The method of claim 1, wherein said weighted random selection is weighted based on classes of service associated with packets to send to each of the plurality of outputs by a corresponding input of the plurality of inputs.

9. The method of claim 1, wherein said weighted random selection is weighted based on at least two items from a group consisting of: (a) the number of packets to send to each of the plurality of outputs by a corresponding input of the plurality of inputs, (b) the number of bytes to send to each of the plurality of outputs by a corresponding input of the plurality of inputs, (c) the last times packets were sent from a corresponding input of the plurality of inputs to each of the plurality of outputs, and (d) classes of service associated with packets to send to each of the plurality of outputs by a corresponding input of the plurality of inputs.

10. The method of claim 1, comprising one or more rounds of generating requests by weighted randomly selecting among all or a subset of the plurality of outputs, and selectively granting said requests corresponding to available bandwidth after said generating the requests for each input and said granting one of said requests and before said sending packets.

11. An apparatus, comprising:

a plurality of request generators;

one or more grant arbiters coupled to the plurality of request generators;

wherein each of the plurality of request generators is configured to weighted randomly generate a request for its associated input of a plurality of inputs of a switch, the request including a weighted random selection of one of a plurality of outputs of the switch;

wherein said one or more grant arbiters are configured to grant requests received from the plurality of request generators such that one request for each requested output is granted; and wherein the plurality of inputs are configured to send packets corresponding to said granted requests.

12. The apparatus of claim 11, comprising a control to configure the switch to setup connections between said inputs and said outputs corresponding to said granted requests.

13. The apparatus of claim 11, wherein said one or more grant arbiters randomly select a request to grant for a particular output from said requests received for the particular output.

14. The apparatus of claim 11, wherein said weighted random selection is weighted based on a number of packets to send to each of the plurality of outputs by a corresponding input of the plurality of inputs.

15. The apparatus of claim 11, wherein said weighted random selection is weighted based on a number of bytes to send to each of the plurality of outputs by a corresponding input of the plurality of inputs.

16. The apparatus of claim 11, wherein said weighted random selection is weighted based on the last times packets were sent from a corresponding input of the plurality of inputs to each of the plurality of outputs.

17. The apparatus of claim 11, wherein said weighted random selection is weighted based on classes of service associated with packets to send to each of the plurality of outputs by a corresponding input of the plurality of inputs.

18. The apparatus of claim 11, wherein said weighted random selection is weighted based on at least two items from a group consisting of: (a) the number of packets to send to each of the plurality of outputs by a corresponding input of the plurality of inputs, (b) the number of bytes to send to each of the plurality of outputs by a corresponding input of the plurality of inputs, (c) the last times packets were sent from a corresponding input of the plurality of inputs to each of the plurality of outputs, and (d) the classes of service associated with packets to send to each of the plurality of outputs by a corresponding input of the plurality of inputs.

19. The apparatus of claim 11, wherein the plurality of inputs are configured to send packets from their respective virtual output queues corresponding to said granted requests.

20. The apparatus of claim 19, wherein the apparatus includes a plurality of line cards and a switching board including the switch, and wherein said virtual output queues are located on the line cards.

21. The apparatus of claim 19, wherein the apparatus includes a plurality of line cards and a switching board including the switch, and wherein said virtual output queues are located on the switching board.

22. An apparatus comprising:

means for generating requests to send packets to outputs of a switch from input inputs of the switch, said means for generating said requests including means for weighted randomly selecting, for each of said inputs having a packet to send, one of said outputs of the switch to which said input has a packet to send;

means for granting one of said requests for each different one of the plurality of outputs for which one or more of said requests were generated; and means for sending packets between said inputs and said outputs corresponding to said granted requests.

23. The apparatus of claim 22, comprising means for configuring the switch to setup connections between said inputs and said outputs corresponding to said granted requests prior to said sending packets.

24. The apparatus of claim 22, wherein said means for weighted randomly selecting includes means for determining a weight based on a number of packets to send to each of said outputs by a corresponding input.

25. The apparatus of claim 22, wherein said means for weighted randomly selecting includes means for determining a weight based on the last times packets were sent from a corresponding input of the plurality of inputs to each of the plurality of outputs.

26. The apparatus of claim 22, wherein said means for weighted randomly selecting includes means for determining a weight based on the classes of service associated with packets to send to each of the plurality of outputs by a corresponding input of the plurality of inputs.

27. A method for scheduling packets, the method comprising:
for each particular input of a plurality of inputs: generating a first request including weighted randomly selecting one of a plurality of outputs;
granting one of said first requests of the plurality of outputs for each different one of the plurality of outputs for which one or more of said first requests was generated;
for each particular input of the plurality of inputs whose first request was not granted: generating a second request including weighted randomly selecting one of the plurality of outputs; and
granting one of said second requests of the plurality of outputs for each different one of the plurality of outputs not already having a corresponding first request granted and for which one or more of said second requests was generated.

28. The method of claim 27, wherein said weighted random selection is weighted based on the number of packets or bytes to send to each of the plurality of outputs by the corresponding input.

29. The method of claim 27, wherein packets are sent between said inputs and said outputs based said granted first and second requests.

30. The method of claim 27, wherein only two request phases are performed per packet time, said two request phases consisting of said generating said first requests and said generating said second requests, said packet time corresponding to the amount of time allocated to receive a packet at an input from an external source.

31. The method of claim 27, wherein each particular request to grant of said first requests and said second requests for each particular output is randomly selected from all the respective said first requests or said second request for said particular output.

32. An apparatus, comprising:
a plurality of request generators;
one or more grant arbiters coupled to the plurality of request generators;
wherein each of the plurality of request generators is configured to weighted randomly generate a first round request and as required a second round request for its associated input of a plurality of inputs of a switch, the first round request includes a first weighted random selection of one of a plurality of outputs and the second round request includes a second weighted random selection of one of the outputs if the first round request was not granted; and
said one or more grant arbiters are configured to grant requests received from the plurality of request generators such that one request for each requested output in the first round of requests is granted, and one request for each requested output in the second round of requests is granted if a grant for said requested output was not generated for a request in the first round of requests.

33. The apparatus of claim 32, wherein said one or more grant arbiters randomly select a request to grant for a output from the set of requests received for the output.

34. The apparatus of claim 32, wherein said weighted random generation is weighted based on the number of packets or bytes to send to each of the plurality of outputs by the corresponding input.

* * * * *